6796X
P. Cooper,
Steam-Boiler Fire-Box.
Patented Oct. 13, 1831.
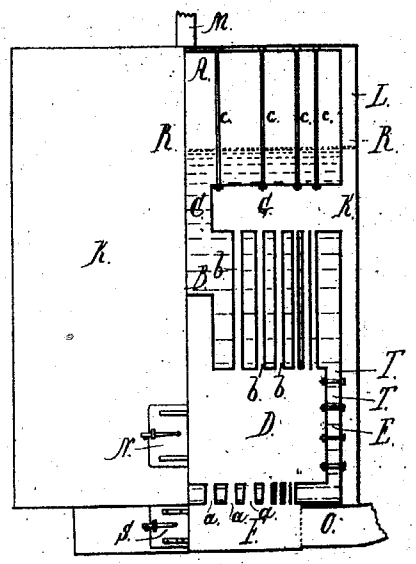
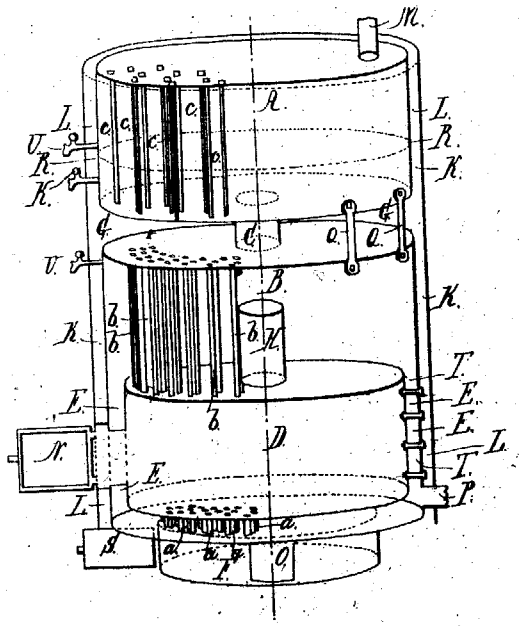

Peter Cooper 6796X
Letters Patent

The schedule referred to in these Letters Patent and making part of the
same containing a description in the words of the said Peter Cooper him-
self of his improvement in the construction of Steam Boilers

---

Know all men by these presents: That I Peter Cooper of the City and State
of New York have invented a new and useful improvement in the mode of
constructing Boilers for the purpose of generating steam which I have nam-
ed "Coopers Steam Boiler" and that the following is a full and exact
description of the construction and operation of the said improvements as
invented by me, The Boiler in the improvement that I have invented is
composed of two upright cylinders (plate 1 fig 1) A and B placed one directly
above the other but not in contact of equal diameter but different heights
Each of these is closed at the ends except as hereinafter described and they
are connected together and a communication established between their
inner areas by a smaller cylinder or pipe C. having the same perpendicu-
lar axis with the larger cylinders and of such length and diameter as the size and
distance apart of the two larger cylinders may require. The upper of these cylinders
A. I call for the sake of clearness "The upper chamber" and the lower B "The
lower chamber of the Boiler". Within the lower chamber B there is a concen-
tric cylinder D. closed likewise at the ends except as hereafter described, be-
tween whose outer cylindrical side and the inside of the lower chamber there
is a space E. of two inches more or less all round according to circumstan-
ces, and the bottom of which is three inches from the bottom of the lower
chamber. This inner cylinder forms the furnace and is so called.
The bottom of the furnace is supported on the bottom of the lower chamber
by tubes a, a, a, a, of about one inch in diameter at the top and an inch
and a quarter at the bottom in the clear and in number proportioned to the
area of the bottom of the furnace and forming a communication between the
inside of the furnace and the outside of the lower chamber or ash hole F.
Through these tubes the cinders fall into the ash hole and through them also a current of air is introduced into the fire. The increased size of them at the
bottom is to prevent the possibility of their being choaked up with cinders.
The top of the furnace is connected with the upper end of the lower chamber
by similar tubes b, b, b, b, of about three quarters of an inch in diameter through
out, by which the draft of the furnace carries the heated air smoke and
dust into the open space G, between the upper and lower chambers. From
the top of the furnace there is a projecting pipe or small cylinder H, of the
same size with that which supports the upper chamber and closed at the
top intended to increase the surface acted upon by the heat. The top and bot
tom of the upper chamber are fastened together by a sufficient number of
bolts c, c, c, c, and in the lower chamber the office of these bolts is performed
by the tubes b, b, b, b, Over the whole apparatus there is a cylindrical co-
vering called the jacket K, K, K, K, the top of which rests upon the bolt heads
on the top of the upper chamber of the boiler and between the sides of which
(the jacket) and the sides of the upper and lower chambers there is an open
space all round of about an inch and three quarters L, L, L, L, The jack
et is open at the bottom. The steam pipe connecting with the cylinder of the
engine proceeds from the top of the upper chamber M. The door of the furnace
N is on the side most convenient. In one side of the ash hole there is an op-
ening, O for the current of air to the fire. The water is supplied by means of a
pipe P entering the lower chamber near the bottom. The upper and low-
er chambers besides being connected by the cylinder or pipe C, are further uni-
ted and preserved always in the same relative position by bars on their
outer sides Q, Q, The draft which is essential to this boiler is best produc-
ed by a fan, although other means may be used. When in operation the
boiler is filled with water so that the upper chamber may be about one
third full at R, R, The water is then in the lower chamber surround-
ing all the tubes at the bottom of the furnace a, a, a, a, through which the
air is introduced (and which do the office of the openings between the bars of
a common grate) and surrounding also the fire itself and the tubes above
the furnace b, b, b, b, through which the heated air passes. The water is also
in the tube between the two chambers and in the upper chamber to the
height before indicated at R, R, The fire being made (and anthracite coal is
preferred preferred on all accounts although coke or wood or bituminous coal
may be used) the fan or other means used to create a strong draft forces a
current of air into the ash hole the door of which being shut the air enters
through the coals of the furnace and then passes highly heated through the
upper tubes into the space between the upper and lower chambers whence
being confined and prevented from ascending by the jacket it passes in
contact with the outside of the two chambers of the boiler still further heating
the water within and is finally by the same draft that introduced it driv-
en out below the bottom of the furnace or by such other outlet as may be found
convenient. When this ~~said~~ boiler is used for locomotive engines the smoke
and dust pass out under the carriage. By this arrangement the
greatest possible surface of water is exposed to the action of the fire, and the
steam generated is in proportion, while the grate upon which the fire
rests being filled with water at all times is not liable to be burnt out
like the ordinary grates. The water too which is below the fire receives
that portion of the heat which has heretofore in the usual mode of construct-
ing boilers been entirely lost to the objects of the machine. The fire being
nowhere in contact with the upper chamber no accident need be
apprehended from the water in it, sinking (through carelessness) be-
low the height here indicated. When a fan is used to produce the draft
it must be worked by hand until the steam is raised so high that it may
be worked by the machinery. In a locomotive engine when the fire is
first put into the furnace the working wheel should be raised a little
from the rail which may be readily done by a screw or lever. Very little
steam will be sufficient then to move the machinery and along with it
the fan. By stopping the fan a damper is at once put upon the fire. there
being no draft except what the fan produces and by changing the veloci-
ty of the fan the degree of draft and the intensity of the heat may be regu-
lated at will. In the apparatus here described I claim as new and as my
own invention and discovery as follows 1 The mode of constructing the bot-
tom of the furnace of parallel plates through which the air is introduc
ed by means of tubes to the fire and between which a constant supply
of water is kept exposed to the action of the fire preserving at the same
time

10/13/1831 6796X tive the surface upon which the fire rests from the destructive effects of
intense heat. N.B. Grates have been constructed with tubes contain-
(ing) water. The fire however converted the water into steam which being
driven out the tubes were liable to be burnt in two, as the solid bars have
been used the water getting to the fire an explosion would take place.
In my invention the air is introduced through tubes and the vol-
ume of water is so great that there must always be sufficient for the purpose
intended. 2 I also claim as my own the separation of the boiler into two
parts and the tubing of the lower one. 3. I also claim as my own the
outer covering or jacket by which the smoke and dust are forced in a
downward direction out under the bottom of the boiler or carriage.
4. And I claim as my own the combination and form here described
in principle as well as in detail.

Witnesses
B. C. Priestman
Jno. H. B. Latrobe

Peter Cooper

1635

Ex.
ChW.